Feb. 27, 1968

A. J. RAUH 3,370,582

PICNIC GRILL KIT

Filed Feb. 3, 1966

ARTHUR J. RAUH
INVENTOR.

BY Wm. E. Ford

ATTORNEY

United States Patent Office 3,370,582
Patented Feb. 27, 1968

3,370,582
PICNIC GRILL KIT
Arthur J. Rauh, 705 Marshall, Houston, Tex. 77006
Filed Feb. 3, 1966, Ser. No. 524,919
10 Claims. (Cl. 126—25)

This invention relates to a picnic grill kit comprising an inexpensive, optionally expendable, easily mounted grill, and a combustible stove or oven which first holds the charcoal or central fuel, an outer oven or stove shell of expendable foil finally enclosing the ash of the inner stove or oven and the charcoal coals.

As a primary object the invention sets out to provide an inexpensive, easily mounted, picnic kit, including an inner oven or stove which supplies part of the combustible material and initially holds the central fuel or charcoal in position beneath the grill, the kit also including an outer oven or stove shell of foil, which finally holds the inner stove or oven ashes and charcoal coals enclosed.

It is also an object of this invention to provide an inexpensive, preferably completely expendable picnic kit of this class, in which hickory chips or like smoke flavoring matter may be provided and held in place and enclosed with charcoal.

It is also a further object of the this invention to provide a picnic grill of this class which includes an initial or kindling fuel, such as excelsior and the like, disposed between the combustible pasteboard stove or oven and the primary fuel or charcoal inwardly thereof.

Other and further objects will be apparent when the specification hereinbelow is considered in connection with the drawings, in which.

Figures 1, 2, 3:
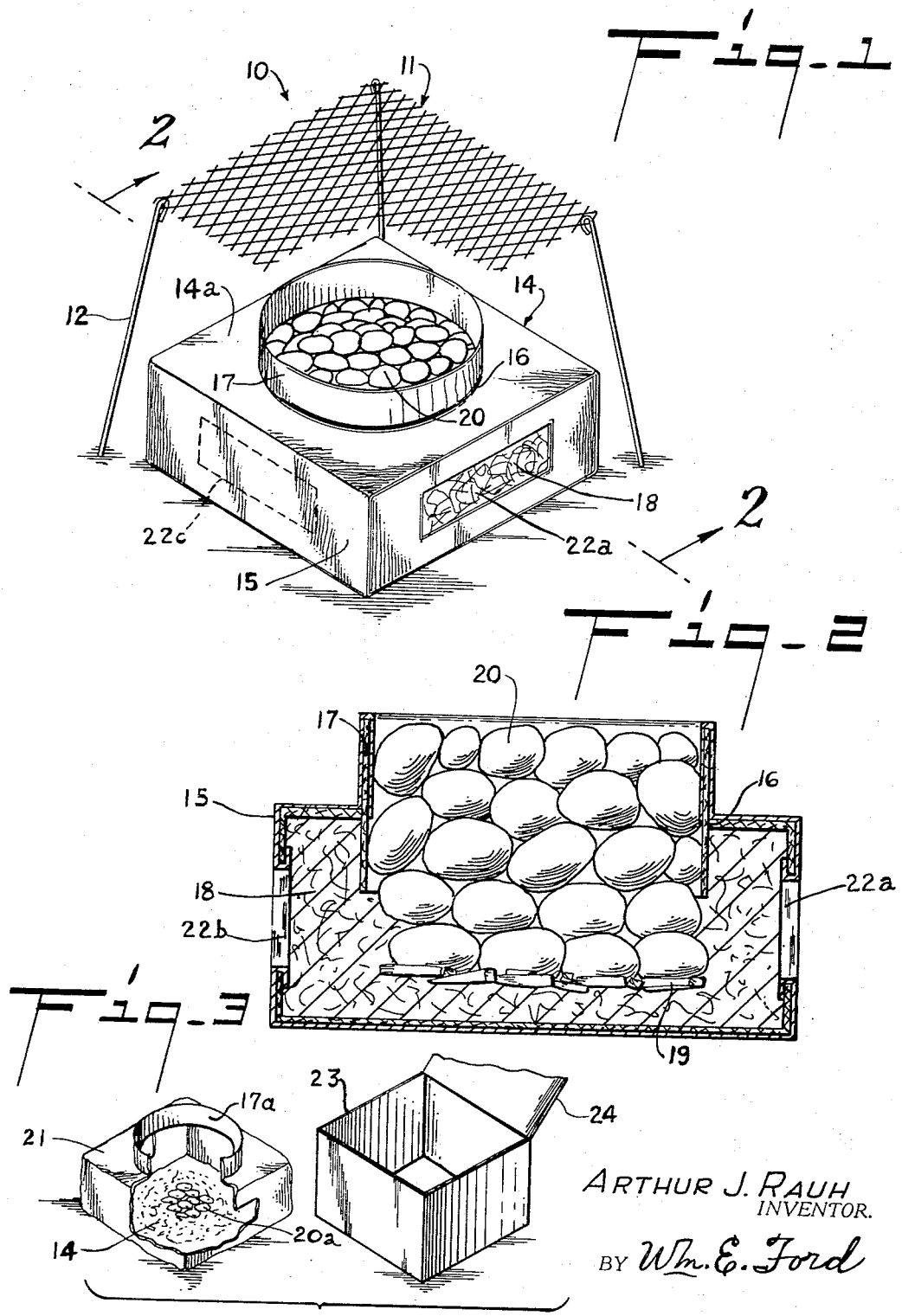
FIG. 1 is an isometric view of an embodiment of a picnic grill comprised by the invention, with the grill mounted above a foil encased stove or oven, as encased by the foil, and with one, of two opposed side windows, being shown through an oven side wall, and with the excelsior, or kindling fuel visible through such window.
FIG. 2 is a sectional elevation taken along the line 2—2 of FIG. 1.
FIG. 3 is a development view showing the box, in which the kit is packed and transported to a picnic location, the grill being shown as not having been unpacked from the box; the development view also showing fragmentarily the foil after the combustible oven or stove form has been burned to ashes, and with remaining charcoal coals being shown centrally therein.

Referring now to the drawings in which like reference numerals are assigned to like elements in the various views, a picnic grill kit 10 is shown in FIG. 1, in which a rectangle, as a square of metallic mesh, wire mesh, or the like, designated by the reference numeral 11, and being of inexpensive character while still strong enough to carry relatively heavy loads of raw food thereon to be cooked, is shown supported by four metallic rods as steel rods 12. The rods have a recurved or hooked upper end 12a connected to be pivoted on the respective corners of the grill, the rods being in length slightly less than the diagonal distance between opposed corners of the grill 11, and preferably having pointed ends opposite the pivots, whereby the rods may be more readily thrust into the ground; these ends thus being indicated but not shown in FIG. 1.

Below the expanded metal or mesh grill 11, a pasteboard box, shown in cross-section as the six sided box 14, in FIG. 2, is shrouded or encased in a thin metallic foil, as an asbestos foil 15. A round hole 16 is cut centrally through the upper side 14a of the box 14, and a cylindrical pipe or collar 17 has its lower end inserted downwardly through the hole 16, so that the collar 17 extends as a flue from within the box 14 and upwardly above its top 14a, the box 14 thus serving initially, by comparison, as an oven, stove or hearth of combustible matter or fuel to hold in place a tinder or kindling material 18, as excelsior, confetti, and the like, filling the sides and bottom of the box 14, and supporting centrally thereabove flavor chips, as hickory 19, and charcoal bricks 20 above the chips to extend up substantially to the top of the flue 17.

Opposed windows 22a and 22b are provided through respective sides 14b, 14c of the box 14, and optionally all four sides of the box 14 may have windows therein, as indicated by the dotted window shown in FIG. 1.

The foil 15, being very thin, is easily foldable and formable thereby to form a complete liner or casing over the box 14, and to extend downwardly, inwardly of the collar 17, and to be folded through and inwardly of the windows 22a, 22b and 22c, and the like.

The box 14 is packed with the tinder 18, chips 19, bricks 20, collar 17 and encasing foil 15 disposed generally as shown in FIG. 2, with the exception that the foil 15 has not been punctured and folded inside the box windows 22a, 22b, and the like, to provide access through the windows and draft, and cross-draft access to the tinder 18.

A shipment box 23 is provided, as shown to the right in the development view of FIG. 3, and the box 14, packed as hereinabove described, is first disposed in the box 23, to rest on the bottom thereof, with the grill 11 being packed to rest flat on top of the collar 17, with the edges of the grill 11 constrained with concentricity with relation to the inner walls of the shipment box 23. Then the opposed grill support legs 12 are folded back to extend diagonally across the grill 11 from opposed corners of the grill 11. Then the top 24 of the box 23 may be folded down upon the grill legs 12 and grill 11, and the box 23 bound for shipment.

The shipment box 23 may also be of light, thin, inflammable, expendable material and so that, if desired, this box 23 may be torn up in parts and also burned as fuel. Also, although hickory chips 19 specifically named, and indicated in FIG. 2, other flavor chips may be employed. Also the chips or second or intermediate kindling interposed between the light tinder 18 and the main cooking fuel, as the charcoal bricks 20, may be thick wooden shavings, small twigs and the like, or in cases the chips or similar functional elements may be omitted.

It may be seen that the picnic grill kit 10 hereinabove described is compactly packaged to save space and to be taken as a light, complete fuel and easily mounted grill, with the fuel being readily and assuredly ignitable whereby the amount of fuel, and the pre-conceived rate of its ignition, may be such that an amount of food, some bit above the amount contemplated for an average picnic, can be prepared by this packaged amount of selected fuels, as barbecued, broiled, or otherwise selectively cooked food.

The arrangement of opposed windows (two or four as may be desired), also the provision of a stack, flue or stove pipe collar, combine in a skillful disposition of draft elements in a secondary or intermediate fuel, which assures the most effective direction of the products of combustion to whatever food may be disposed upon the grill. Also, the disposition of the kindling and/or tinder material with relation to the primary fuel and the secondary fuel, insures that the secondary fuel is consumed and that the primary fuel, as the charcoal bricks, are fully ignited, sometimes, at least before the secondary fuel is all consumed.

It should be noticed that the foil 15 changes its character and function from a heat retaining sheath or liner for the box 14 to the hearth, oven, or stove as the box 14 and collar 17 are consumed. Thus, as shown, as the left element in the development view of FIG. 3, as the final picnic preparations near completion, the thin foil 15 retains the ashes 14a and the charcoal embers 20a, while the recurved collar 17a has taken over the flue function of the now consumed former collar 17.

The kit 10 is designated to be all expended, if such may be desired. Thus, the legs 12 of the grill 11 may be withdrawn from the earth, and the grill 11 discarded as upon a picnic ground dump. Also the shipment box 23 may be disposed of, as on the aforesaid dump, in case it is not burned, or not considered of such value as to be carried back home when the picnic is over.

The invention is not limited to the exact kit elements hereinabove described, nor to the exact arrangement of draft passages, nor to the exact double functioning of the various elements. In fact other combinations of elements, draft passage arrangements, and elements with combined functions are considered as long as such may fall within the broad spirit of the invention, and within the broad scope of interpretation claimed for, and merited by, the appended claims.

What is claimed is:

1. A picnic grill kit comprising a secondary fuel including fire consumable box and low heat content fuel means within said box, a primary fuel of higher heat content disposed centrally within said box to be surrounded by, and supported above, said low heat content fuel means and to upstand thereabove as surrounded by a central opening provided in the top of the box, window means provided in opposed sides of said box, and a foldable foil surrounding said box and lining said window means and said opening, a perforate grill including legs connected at the corners to be pivoted at right angles to said corners and into the ground above said box to support said grill, whereby food may be supported on said grill and upon ignition of said low heat content fuel means through said window means it is burned to commence the burning of said higher heat content fuel with heat being directed upwardly through and above said opening to be applied directly under the food to be cooked.

2. A picnic grill kit as claimed in claim 1 in which said low heat content fuel means includes a cylindrical flue extending above and downwardly through said opening.

3. A picnic grill kit as claimed in claim 1 in which said primary fuel comprises charcoal bricks.

4. A picnic grill kit as claimed in claim 1 in which said low heat content fuel means includes a highly inflammable excelsior.

5. A picnic grill kit as claimed in claim 1 in which said low heat content fuel means includes a highly inflammable excelsior and hickory flavor chips supported thereabove and below said primary fuel.

6. A picnic grill kit as claimed in claim 1 in which said box is of rectangular cross-section in plan and in which said windows are disposed in at least two opposite sides of said box.

7. A picnic grill kit as claimed in claim 1 in which said foil is aluminum foil.

8. A picnic grill kit as claimed in claim 1 which additionally includes a shipment box with said combustible box and contents being deposited therein and with said grill with legs folded diagonally thereacross being supported by said combustible box.

9. A picnic grill kit as claimed in claim 1 in which said primary fuel upstands within said box for substantially over half the height thereof.

10. A picnic grill kit as claimed in claim 1 in which said primary fuel upstands within said box for not more than half the height thereof.

References Cited

UNITED STATES PATENTS

| 1,232,276 | 7/1917 | Gillett | 126—59.5 |
| 2,122,275 | 6/1938 | Bitney | 126—25 |
| 2,965,096 | 12/1960 | Barton | 126—25 |
| 2,967,023 | 1/1961 | Huckabee | 239—60 |
| 2,981,249 | 4/1961 | Russell et al. | 126—25 |
| 3,261,346 | 7/1966 | Waddell et al. | 126—59.5 |

FREDERICK KETTERER, *Primary Examiner.*